(12) United States Patent
Gambino et al.

(10) Patent No.: US 6,552,157 B2
(45) Date of Patent: Apr. 22, 2003

(54) POLYURETHANES CONTAINING SECONDARY AMIDE GROUPS AND THEIR USE IN ONE-COMPONENT THERMOSET COMPOSITIONS

(75) Inventors: Charles A. Gambino, McDonald, PA (US); Karen M. Henderson, Coraopolis, PA (US); Patricia B. Jacobs, Pittsburgh, PA (US); Sze-Ming Lee, Houston, TX (US); Robert A. Sylvester, Carnegie, PA (US)

(73) Assignee: Bayer Corporation, Pittsburgh, PA (US)

( * ) Notice: Subject to any disclaimer, the term of this patent is extended or adjusted under 35 U.S.C. 154(b) by 1 day.

(21) Appl. No.: 09/730,080

(22) Filed: Dec. 5, 2000

(65) Prior Publication Data

US 2002/0068800 A1 Jun. 6, 2002

(51) Int. Cl.$^7$ .............................................. C08G 18/32
(52) U.S. Cl. .................... 528/85; 528/392; 525/452; 525/472; 428/423.1
(58) Field of Search .................... 528/85, 392; 525/452, 525/472; 428/423.1

(56) References Cited

U.S. PATENT DOCUMENTS 5,780,559 A 7/1998 Humbert et al. ............ 525/452

FOREIGN PATENT DOCUMENTS

JP 03028225 * 2/1991

\* cited by examiner

*Primary Examiner*—Rachel Gorr
(74) *Attorney, Agent, or Firm*—Jospeh C. Gil; Thomas W. Roy

(57) ABSTRACT

The present invention relates to polyurethanes containing secondary amide groups in the backbones of the polyurethanes, wherein the secondary amide groups (calculated as NH—CO—, MW 43) are present in an amount of 1 to 14% by weight, based on the weight of the polyurethanes, and correspond to the formula $$-X_1-R_1-NH-C(O)-R_2-X_2- \qquad (I)$$

wherein $X_1$ and $X_2$ are the same or different and represent the groups obtained by removing a hydrogen atom from a hydroxy group or a primary or secondary amino group and $R_1$ and $R_2$ are the same or different and represent linear or branched hydrocarbon groups that are optionally substituted by groups that do not contain isocyanate-reactive hydrogen atoms.

The present invention also relates to one-component, thermoset compositions containing the polyurethanes with secondary amide groups in the backbone and a cross-linking component that is reactive with amide groups. Finally, the present invention relates to coatings, sealants and adhesives prepared from these one-component, thermoset compositions.

12 Claims, No Drawings

POLYURETHANES CONTAINING SECONDARY AMIDE GROUPS AND THEIR USE IN ONE-COMPONENT THERMOSET COMPOSITIONS

BACKGROUND OF THE INVENTION

1. Field of the Invention

The present invention relates to polyurethanes containing amide groups in the backbone of the polyurethane; to one-component, thermoset compositions containing these polyurethanes and a cross-linking component; and to coatings, sealants and adhesives prepared from these compositions.

2. Description of the Prior Art

One-component polyurethane coating compositions containing polyisocyanates blocked with reversible, monofunctional blocking agents for isocyanate groups and polyols are an important class of materials for applications such as automotive OEM coatings. While these one-component compositions overcome the difficulties of two-component coating compositions with regard to accurate metering of the components, the one-component coating compositions also have disadvantages, which are primarily caused by the volatilization of the blocking agent.

The release of the blocking agent can cause blistering and yellowing in thick films and oven fouling. In addition, the blocking agents are considered to be volatile organic compounds (VOC's) in the same manner as organic solvents. Therefore, certain coating compositions may not satisfy environmental regulations solely due to the presence of blocking agents.

It is an object of the present invention to overcome the known disadvantages of one-component coating compositions caused by the release of blocking agents during cure without affecting the advantages of these coating compositions when compared to two-component coating compositions.

These objects can be achieved with the one-component compositions according to the present invention, which are based on polyurethanes containing amide groups in the backbone of the polyurethane and crosslinking agents that are reactive with amide groups. These compositions do not require blocking agents and, thus, do not release blocking agents. When the one-component compositions according to the invention are cured, the only compounds released are water or monoalcohols, which are much less toxic than conventional blocking agents.

U.S. Pat. No. 5,780,559 discloses polyurethanes containing amide groups; however, the amide groups are present in terminal positions as opposed to being present in the backbone. A teaching of the presence of amide groups in terminal positions would not suggest their use in the backbone, especially in view of the comparison examples set forth hereinafter. These examples demonstrate that amide groups in pendant positions are not suitable for use in one-component thermoset compositions because they separate into two phases in the presence of common lacquer solvents.

SUMMARY OF THE INVENTION

The present invention relates to polyurethanes containing an average of at least two secondary amide groups in the backbones of the polyurethanes, wherein the secondary amide groups (calculated as NH—CO—, MW 43) are present in an amount of 1 to 14% by weight, based on the weight of the polyurethanes, and correspond to the formula $$-X_1-R_1-NH-C(O)-R_2-X_2- \quad (I)$$

wherein $X_1$ and $X_2$ are the same or different and represent the groups obtained by removing a hydrogen atom from a hydroxy group or a primary or secondary amino group and $R_1$ and $R_2$ are the same or different and represent linear or branched hydrocarbon groups that are optionally substituted by groups that do not contain isocyanate-reactive hydrogen atoms.

The present invention also relates to one-component, thermoset compositions containing the polyurethanes with secondary amide groups in the backbone and a cross-linking component that is reactive with amide groups. Finally, the present invention relates to coatings, sealants and adhesives prepared from these one-component, thermoset compositions.

DETAILED DESCRIPTION OF THE INVENTION

In accordance with the present invention the term "polyurethane" means polymers containing urethane and/or urea groups.

The polyurethanes according to the invention may be prepared by reacting a polyisocyanate component with a compound corresponding to formula 11, a chain terminator, optionally a high molecular weight isocyanate-reactive component and optionally a low molecular weight chain extender in either a one-step or a two-step process, preferably by a two-step process. In the one-step process all of the components are mixed together and reacted in one step. In the two-step process an NCO prepolymer is formed in the first step and subsequently reacted with a chain terminator in the second step to form the polyurethane.

Any of the known starting materials for preparing polyurethanes may be used according to the invention, provided that sufficient isocyanate groups are reacted with the compounds corresponding to formula 11 to obtain the required secondary amide group content.

The groups set forth in formula I can be incorporated by reacting isocyanate groups with compounds corresponding to the formula $$HX_1-R_1-NH-C(O)-R_2-X_2H \quad (II)$$

wherein $X_1$ and $X_2$ are the same or different and represent the groups obtained by removing a hydrogen atom from a hydroxy group or a primary or secondary amino group, preferably a hydroxy group, and $R_1$ and $R_2$ are the same or different and represent linear or branched hydrocarbon groups that are optionally substituted by groups that do not contain isocyanate-reactive hydrogen atoms, preferably linear or branched aliphatic hydrocarbon groups having 1 to 10, more preferably 1 to 6 carbon atoms.

The compounds of formula II may be prepared by any suitable method. For example, a compound containing a primary amino group and a hydroxy group or a primary or secondary amino group can be reacted with a compound containing an acid group and either a hydroxy group or a primary or secondary amino group to form a compound corresponding to formula II.

When the acid groups and primary amino groups are reacted directly a salt is initially formed, which can subsequently be converted to the amide by dehydration or heating. To form amide groups directly, it is preferred to react the primary amino groups with carboxylic acid esters or acid chlorides.

Suitable compounds containing a primary amino group and at least one hydroxy, primary amino or secondary amino group include the polyamines and amino alcohols known from polyurethane chemistry, preferably those having a molecular weight of less than 400. Examples of suitable polyamines are disclosed in U.S. Pat. No. 4,701,480, herein incorporated by reference. Preferred compounds are the amino alcohols such ethanol amine and the isomeric propanol and butanol amines. Isopropanol amine is especially preferred.

Suitable compounds containing an acid group and a hydroxy group or a primary or secondary amino group include hydroxy aliphatic acids and amino aliphatic acids, such as hydroxy ethanoic acid, amino ethanoic acid, and the isomeric hydroxy and amino propanoic and butanoic acids. Also suitable are cyclic compounds that can be hydrolyzed to form compounds containing acid groups and either hydroxy or amino groups. Examples include lactones, such as ε-caprolactone, and lactams, such as ε-caprolactam. ε-caprolactone is especially preferred.

In accordance with the present invention the polyurethanes contain at least 2, preferably 2 to 6 and more preferably 2 to 4 secondary amide groups in the backbones of the polyurethanes. Accordingly, the compounds corresponding to formula II are present in an amount sufficient to incorporate a minimum amount of 1%, preferably 2% and more preferably 3% by weight, and a maximum amount of 14%, preferably 12% and more preferably 10% by weight, of the secondary amide groups (calculated as NH—CO—, MW 43), wherein the percentages are based on the weight of the polyurethanes.

Examples of suitable polyisocyanates which may be used to prepare the polyurethanes include monomeric polyisocyanates represented by the formula $$R(NCO)_2$$

in which R represents an organic group obtained by removing the isocyanate groups from an organic diisocyanate having a molecular weight of about 112 to 1,000, preferably about 140 to 400. Diisocyanates preferred for the process according to the invention are those represented by the above formula in which R represents a divalent aliphatic hydrocarbon group having 4 to 40, preferably 4 to 18 carbon atoms, a divalent cycloaliphatic hydrocarbon group having 5 to 15 carbon atoms, a divalent araliphatic hydrocarbon group having 7 to 15 carbon atoms or a divalent aromatic hydrocarbon group having 6 to 15 carbon atoms.

Examples of suitable organic diisocyanates include 1,4-tetramethylene diisocyanate, 1,6-hexamethylene diisocyanate, 2,2,4-trimethyl-1,6-hexa-methylene diisocyanate, 1,12-dodecamethylene diisocyanate, cyclohexane-1,3- and -1,4-diisocyanate, 1-isocyanato-2-isocyanatomethyl cyclopentane, 1-isocyanato-3-isocyanatomethyl-3,5,5-trimethyl-cyclohexane (isophorone diisocyanate or IPDI), bis-(4-iso-cyanatocyclohexyl)-methane, 2,4'-dicyclohexyl-methane diisocyanate, 1,3-and 1,4-bis-(isocyanatomethyl)-cyclohexane, bis-(4-isocyanato-3-methyl-cyclohexyl)-methane, α,α,α',α'-tetramethyl-1,3- and/or -1,4-xylylene diisocyanate, 1-isocyanato-1-methyl-4 (3)-isocyanatomethyl cyclohexane, 2,4- and/or 2,6-hexahydrotoluylene diisocyanate, 1,3- and/or 1,4-phenylene diisocyanate, 2,4- and/or 2,6-toluylene diisocyanate, 2,4- and/or 4,4'-diphenyl-methane diisocyanate, 1,5-diisocyanato naphthalene and mixtures thereof.

Polyisocyanates containing 3 or more isocyanate groups such as 4-isocyanatomethyl-1,8-octamethylene diisocyanate and aromatic polyisocyanates such as 4,4',4"-triphenylmethane diisocyanate and polyphenyl polymethylene polyisocyanates obtained by phosgenating aniline/formaldehyde condensates may also be used.

Preferred organic diisocyanates include 1,6-hexamethylene diisocyanate, 1-isocyanato-3-isocyanatomethyl-3,5,5-trimethyl-cyclohexane (isophorone diisocyanate or IPDI), bis-(4-isocyanato-cyclohexyl)-methane, 1-isocyanato-1-methyl-4(3)-isocyanatomethyl cyclohexane, 2,4- and/or 2,6-toluylene diisocyanate, and 2,4- and/or 4,4'-diphenyl-methane diisocyanate.

In accordance with the present invention a portion of the polyisocyanate component may be in the form of a polyisocyanate adduct. Suitable polyisocyanate adducts are those containing isocyanurate, uretdione, biuret, urethane, allophanate, iminooxadiazine dione, carbodiimide and/or oxadiazinetrione groups. Preferred polyisocyanate adducts are the polyisocyanates containing isocyanurate groups, uretdione, biuret groups, iminooxadiazine dione groups and/or allophanate groups. The polyisocyanates adducts have an average functionality of 2 to 6 and an NCO content of 5 to 30% by weight. Preferably, the polyisocyanate component contains less than 30%, more preferably less than 10%, based on the weight of the polyisocyanate component, of polyisocyanate adducts having a functionality of greater than 2.5. Most preferably, monomeric polyisocyanates are exclusively used to prepare the polyurethanes.

Optional components for preparing the NCO prepolymers include organic compounds containing at least two isocyanate-reactive groups, preferably at least two hydroxy groups. These organic compounds include high molecular weight compounds having molecular weights of 400 to about 6,000, preferably 800 to about 3,000, and optionally low molecular weight compounds with molecular weights below 400. The molecular weights are number average molecular weights ($M_n$) and are determined by end group analysis (OH and/or NH number).

Examples of the high molecular weight compounds are polyester polyols, polyether polyols, polyhydroxy polycarbonates, polyhydroxy polyacetals, polyhydroxy polyacrylates, polyhydroxy polyester amides and polyhydroxy polythioethers. The polyester polyols, polyether polyols and polyhydroxy polycarbonates are preferred, while the polyester polyols and polyhydroxy polycarbonates are more preferred.

Further details concerning the low molecular weight compounds and the starting materials and methods for preparing the high molecular weight polyhydroxy compounds are disclosed in U.S. Pat. No. 4,701,480, herein incorporated by reference.

Prior to the reaction with the monofunctional chain terminators, the NCO prepolymers generally have an isocyanate content of 0.5 to 12% by weight, preferably 1 to 10% by weight and more preferably 3 to 10% by weight. The NCO prepolymers are prepared in known manner by the reaction of the above mentioned starting materials at a temperature of 40 to 120° C., preferably 50 to 100° C., and at an NCO/OH (or NH) equivalent ratio of about 1.1:1 to 1.5:1, preferably about 1.2:1 to 1.5:1 and more preferably about 1.33:1 to 1.5:1.

The terminal isocyanate groups are reacted with a monofunctional isocyanate-reactive compound, such as a hydroxyl group or a primary or secondary monoamine, preferably a hydroxyl group. Examples include the known aliphatic, cycloaliphatic, araliphatic and aromatic monofunctional compounds, preferably aliphatic or cycloaliphatic compounds and more preferably aliphatic compounds. The monofunctional compounds preferably have a molecular weight of less than 400.

Examples include methanol, ethanol, n-propanol, isopropanol and the isomeric butanols, hexanols and octanols and the corresponding monofunctional compounds containing a primary or secondary amino group. Especially preferred are the aliphatic alcohols having 1 to 8 carbon atoms.

In accordance with the present invention it is also possible to prepare prepolymers having terminal isocyanate-reactive groups and to subsequently react these prepolymers with monoisocyanate compounds, which correspond to the previously described monofunctional isocyanate-reactive compounds. Especially preferred are the aliphatic monoisocyanates. The prepolymers having terminal isocyanate-reactive groups are prepared in the same manner as the previously described NCO prepolymers except that an excess of the isocyanate-reactive compounds is used.

To prepare the one-component, thermoset compositions the polyurethanes containing secondary amide groups in the backbone are blended with a compound that is reactive with the amide groups. These reactive groups include active methylol or methylalkoxy groups on aminoplast crosslinking agents or on other compounds such as phenol/formaldehyde adducts.

Examples compounds containing active methylol or methylalkoxy groups include melamine formaldehyde resins (including monomeric or polymeric melamine resins and partially or fully alkylated melamine resins), urea resins (e.g., methylol ureas such as urea formaldehyde resins and alkyoxy ureas such as butylated urea formaldehyde resins), N-methylol acrylamide emulsions and isobutoxy methyl acrylamide emulsions. Preferred are aminoplast resins such as melamine formaldehyde resins or urea formaldehyde resins.

To control the crosslink density of the final product, it is possible to react off one or more of the amino nitrogens or hydroxy groups. For example, alkylated melamine/formaldehyde or urea/formaldehyde resins can be reacted with a compound corresponding to formula III

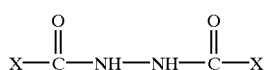

(III)

wherein X and R' are as defined above.

In the one-component, thermoset compositions according to the invention the compounds corresponding to formula I and the coreactants should preferably be present in an amount sufficient to provide an equivalent ratio of modified hydrazide groups to the groups that are reactive with the modified hydrazide groups of 2:1 to 1:6, more preferably 1.5:1 to 1:3 and most preferably 1.2:1 to 1:2.5. When aminoplast resins, especially melamine resins, are used, they may be present in an amount of 10 to 70%, based on weight of the reactive components. This amount is higher than the above equivalent ratios, since these resins may also undergo self-crosslinking.

When aminoplast compounds, especially monomeric melamines are used as the co-reactant for the compounds of formula 1, strong acid catalysts are preferred. These catalysts are well known and include p-toluenesulfonic acid, dinonylnaphthalene disulfonic acid, dodecylbenzenesulfonic acid, phenyl acid phosphate, monobutyl maleate, butyl phosphate and hydroxy phosphate ester. Other catalysts that may be useful include Lewis acids, zinc salts and tin salts.

The one-component compositions may contain the organic solvents known from melamine chemistry. These solvents may be present in an amount of up to 95%, preferably up to 80%, based on the total weight of the thermoset composition. Alcohols may be added to improve shelf stability.

The one-component, thermoset compositions of the present invention are suitable for preparing coatings, adhesives or sealants. Depending upon the particular application the compositions may also contain known additives, such as leveling agents, wetting agents, flow control agents, anti-skinning agents, antifoaming agents, fillers (such as silica, aluminum silicates and high-boiling waxes), viscosity regulators, plasticizers, pigments, dyes, UV absorbers and stabilizers against thermal and oxidative degradation.

The one-component compositions may be applied to any heat resistant substrates, preferably metals, glass and ceramics, and more preferably metals. They may be applied by standard methods, such as spray coating, spread coating, flood coating, casting, dip coating, roll coating. The coating compositions may be clear or pigmented.

The one-component, thermoset compositions are cured at elevated temperatures of 80 to 250° C., preferably 100 to 230° C. and more preferably 100 to 160° C., for a period of 5 to 60 minutes, preferably 10 to 50 minutes and more preferably 20 to 40 minutes.

The invention is further illustrated, but is not intended to be limited by the following examples in which all parts and percentages are by weight unless otherwise specified.

EXAMPLES

Preparation of Amide Diol 1—Corresponding to Formula 2

512 parts of DL-1-amino-2-propanol were stirred in a 2 liter, 3-necked round-bottomed flask under nitrogen. 777 parts of ε-caprolactone were dripped in over 90 minutes, while the temperature of the reaction mixture was maintained at approx. 30° C. with an ice water bath. The reaction mixture was stirred overnight at room temperature. The crude product was used without further purification and primarily contained the following product:

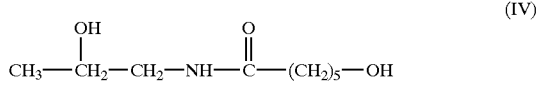

(IV)

Preparation of hydroxy-amide amine 1
(Comparison)

116 parts of DL-1-amino-2-propanol were stirred in a 500 ml, 3-necked round-bottomed flask at room temperature under nitrogen. 110 parts of powdered acrylamide were added in small portions, while maintaining the temperature of the reaction mixture at about 30° C. After about half of the total amount of acrylamide had been added, the reaction mixture became a solid. The temperature was increased to 80° C. to melt the solid and the addition of acrylamide was continued. The product was a clear solution at 80° C., which solidified at room temperature and primarily contained the following product:

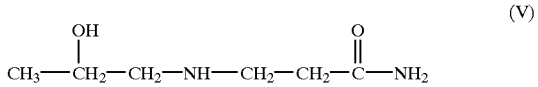

Example 1

180 parts of isophorone diisocyanate were dissolved in 228 parts of MIBK. The solution was stirred at 45° C. in a 1 liter, 3-necked round-bottomed flask. 0.8 parts of dibutyltin dilaurate catalyst were added. 100 parts of amide diol 1 were dripped in over 90 minutes while maintaining the temperature at 50–55° C. The reaction mixture was then stirred at 55° C for 3 h. 61 parts of 2-ethylhexanol were added and the mixture stirred overnight at room temperature. A second portion of MIBK was charged to adjust the concentration to 60 wt. % solids. The final product had a viscosity of 3700 cps at 25° C.

Example 2 (Comparison)

A mixture of 59 parts of 2-ethylhexanol, 100 parts of hydroxy-amide amine 1 and 244 parts of MIBK was stirred in a 2 liter, round-bottomed flask at 80° C. 180 parts of isophorone diisocyanate were dripped in. The product was not soluble in MIBK and separated into two phases.

This example demonstrates the need to use the compounds according to formula II, which contain secondary amide groups in the backbone, to prepare the polyurethane according to the invention. Compounds containing pendant amide groups cannot be used to prepare polyurethanes that are soluble in conventional solvents.

Example 3

A coating composition was prepared from 40 parts of the product of Example 1, 5 parts of methoxylated hexamethylol melamine (Resimene 747, Solutia) 1.5 parts of MIBK, and 1.5 parts of a 20% solution of p-toluenesulfonic acid in isopropanol. The composition was drawn down onto a rolled steel panel with a 5 mil drawdown bar and baked at 130° C. for 30 min. The resulting coating was clear and insoluble in acetone.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A polyurethane containing secondary amide groups in the backbone of the polyurethane, wherein the polyurethane contains an average of 2 to 6 secondary amide groups and wherein the secondary amide groups (calculated as NH—CO—, MW 43) are present in an amount of 1 to 14% by weight, based on the weight of the polyurethane, and correspond to the formula $$-X_1-R_1-NH-C(O)-R_2-X_2- \quad (I)$$

wherein $X_1$, and $X_2$ are the same or different and represent the groups obtained by removing a hydrogen atom from a hydroxy group or a primary or secondary amino group and $R_1$ and $R_2$ are the same or different and represent linear or branched hydrocarbon groups that are optionally substituted by groups that do not contain isocyanate-reactive hydrogen atoms.

2. The polyurethane of claim 1 wherein $X_1$ and $X_2$ represent the groups obtained by removing a hydrogen atom from a hydroxy group and $R_1$ and $R_2$ are the same or different and represent linear or branched aliphatic hydrocarbon groups having 1 to 10 carbon atoms.

3. The polyurethane of claim 1 wherein the secondary amide groups of formula I are obtained by removing the hydrogen atoms from the hydroxy groups present in the reaction product of a hydroxyalkyl amine and ε-caprolactone.

4. A one-component, thermoset composition containing the polyurethane of claim 1 and a melamine formaldehyde resin, a urea resin, an N-methylol acrylamide emulsion or an isobutoxy methyl acrylamide emulsion.

5. A one-component, thermoset composition containing the polyurethane of claim 1, an acid catalyst and a melamine formaldehyde resin or a urea resin.

6. A heat resistant substrate coated with the thermoset composition of claim 4.

7. A heat resistant substrate coated with the thermoset composition of claim 5.

8. A polyurethane containing secondary amide groups in the backbone of the polyurethane, wherein the polyurethane contains an average of 2 to 6 secondary amide groups and wherein the secondary amide groups (calculated as NH—CO—, MW 43) are present in an amount of 1 to 10% by weight, based on the weight of the polyurethane, and correspond to the formula $$-X_1-R_1-NH-C(O)-R_2-X_2- \quad (I)$$

wherein $X_1$ and $X_2$ are the same or different and represent the groups obtained by removing a hydrogen atom from a hydroxy group or a primary or secondary amino group and $R_1$ and $R_2$ are the same or different and represent linear or branched hydrocarbon groups that are optionally substituted by groups that do not contain isocyanate-reactive hydrogen atoms.

9. The polyurethane of claim 8 wherein $X_1$ and $X_2$ represent the groups obtained by removing a hydrogen atom from a hydroxy group and $R_1$ and $R_2$ are the same or different and represent linear or branched aliphatic hydrocarbon groups having 1 to 10 carbon atoms.

10. The polyurethane of claim 8 wherein the secondary amide groups of formula I are obtained by removing the hydrogen atoms from the hydroxy groups present in the reaction product of a hydroxyalkyl amine and ε-caprolactone.

11. A one-component, thermoset composition containing the polyurethane of claim 8 and a melamine formaldehyde resin, a urea resin, an N-methylol acrylamide emulsion or an isobutoxy methyl acrylamide emulsion.

12. A one-component, thermoset composition containing the polyurethane of claim 8, an acid catalyst and a melamine formaldehyde resin or a urea resin.

* * * * *